US012719727B2

(12) United States Patent
Liu

(10) Patent No.: US 12,719,727 B2
(45) Date of Patent: Aug. 25, 2026

(54) DATA TRANSMISSION METHOD, APPARATUS AND COMMUNICATION DEVICE

(71) Applicant: VIVO MOBILE COMMUNICATION CO., LTD., Dongguan (CN)

(72) Inventor: Jinhua Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 574 days.

(21) Appl. No.: 18/118,709

(22) Filed: Mar. 7, 2023

(65) Prior Publication Data

US 2023/0224201 A1 Jul. 13, 2023

Related U.S. Application Data

(63) Continuation of application No. PCT/CN2021/117118, filed on Sep. 8, 2021.

(30) Foreign Application Priority Data

Sep. 8, 2020 (CN) ......................... 202010937451.3

(51) Int. Cl.
*H04L 27/26* (2006.01)
*H04W 80/02* (2009.01)
*H04W 88/08* (2009.01)

(52) U.S. Cl.
CPC ......... *H04L 27/2605* (2013.01); *H04W 80/02* (2013.01); *H04W 88/08* (2013.01)

(58) Field of Classification Search
CPC ........... H04L 27/2605; H04L 27/2602; H04W 80/02; H04W 88/08; H04W 88/085; H04W 72/231; H04W 76/14; H04W 28/06; H04B 7/15542
See application file for complete search history.

(56) References Cited

U.S. PATENT DOCUMENTS

2019/0174432 A1* 6/2019 Wang .................... H04W 72/21
2021/0227544 A1* 7/2021 Luo ........................ H04L 5/0091
2021/0273836 A1* 9/2021 Luo ........................ H04L 5/0073
2021/0297959 A1* 9/2021 Zhou ...................... H04L 5/0051
2022/0131729 A1* 4/2022 You ...................... H04L 27/2607
2023/0076450 A1* 3/2023 Liu ........................ H04L 5/0037
(Continued)

FOREIGN PATENT DOCUMENTS

CN 109587659 A 4/2019
CN 110831187 A 2/2020
CN 111052837 A 4/2020

OTHER PUBLICATIONS

3GPP TSG-RAN WG2 Meeting #109 electronic; R2-2000528; Source: Huawei, HiSilicon; Title: TP for Guard Symbols MAC CEs; Feb. 24-Mar. 6, 2020, (Year: 2020).*
(Continued)

*Primary Examiner* — Mohammed S Chowdhury
(74) *Attorney, Agent, or Firm* — IPX PLLC

(57) ABSTRACT

A data transmission method and apparatus, and a communication device are provided. The data transmission method is performed by a first communication device, including: generating a desired guard symbol medium access control layer control element (MAC CE) when a preset trigger condition is met; and sending the desired guard symbol MAC CE to a second communication device.

20 Claims, 3 Drawing Sheets

(56) References Cited

U.S. PATENT DOCUMENTS

2023/0247574 A1* 8/2023 Ghanbarinejad ... H04W 56/001 370/503
2023/0327928 A1* 10/2023 Liu ...................... H04L 5/0094 370/329

OTHER PUBLICATIONS

3GPP TSG RAN WG1 Meeting #98bis; R1-1910051; Source: Huawei, HiSilicon; Title: Resource multiplexing between backhaul and access in IAB; Chongqing, China, Oct. 14-20, 2019. (Year: 2019).*
3GPP TSG RAN WG1 Meeting #99; R1-1911856; Source: Huawei, HiSilicon; Title: Resource multiplexing between backhaul and access in IAB; Reno, USA, Nov. 18-22, 2019 (Year: 2019).*
3GPP TSG RAN WG1 #99; R1-1912533; Source: CMCC; Title: Discussion on resource multiplexing among backhaul and access links; Reno, USA, Nov. 18-22, 2019 (Year: 2019).*
63027252-SPEC_2020-05-19_Ghanbarinejad_7574 (Year: 2020).*
International Search Report issued in corresponding International Application No. PCT/CN2021/117118, mailed Nov. 26, 2021, 4 pages.
Huawei, HiSilicon, "TP for Guard Symbols MAC CEs", 3GPP TSG-RAN WG2 Meeting #109 electronic, R2-2000528, Apr. 2020, 8 pages.
Samsung, "IAB MAC—miscellaneous corrections and clarifications", 3GPP TSG-RAN WG2 Meeting #111-e, R2-2008502, Sep. 2020, 16 pages.
Extended European Search Report issued in related European Application No. 21865991.0, mailed Feb. 20, 2024, 8 pages.
Huawei et al: "Correction on Guard Symbols MAC CE", 3GPP Draft; R2-2007968, Aug. 2020, 3 pages.
VIVO: "On Guard Symbol MAC CE Design", 3GPP Draft; R2-2004494, May 2020, 7 pages.
First Office Action issued in related Chinese Application No. 202010937451.3, mailed Oct. 8, 2024, 8 pages.
Huawei,HiSilicon, "Remaining issues of Guard Symbols MAC CE", 3GPP tsg_ran\wg2_rl2,tsgr2_109bise, R2-2003016, mailed Apr. 10, 2020, 3 pages.

* cited by examiner

DATA TRANSMISSION METHOD, APPARATUS AND COMMUNICATION DEVICE

CROSS-REFERENCE TO RELATED APPLICATIONS

This application is a continuation of International Application No. PCT/CN2021/117118, filed Sep. 8, 2021, which claims priority to Chinese Patent Application No. 202010937451.3, filed Sep. 8, 2020. The entire contents of each of the above-referenced applications are expressly incorporated herein by reference.

TECHNICAL FIELD

This application relates to the field of communication technologies, and specifically, to a data transmission method and apparatus, and a communication device.

BACKGROUND

In an Integrated Access Backhaul (IAB) system, one access point (IAB node) can find one uplink access point (parent IAB node), and establish a wireless connection with the uplink access point. The wireless connection is referred to as a backhaul link.

At present, a child IAB node cannot send a desired guard symbol Medium Access Control (MAC) Control Element (CE) to a parent IAB node in time, so the parent IAB node cannot send a provided guard symbol MAC CE to the child IAB node in time. In this way, a quantity of the guard symbols cannot be configured or reconfigured in time, which further resulting in confusion in a transceiver state transition between a Mobile Termination (MT) function part and a Distributed Unit (DU) function part of the IAB node, reducing the performance of the backhaul link.

SUMMARY

An objective of embodiments of this application is to provide a data transmission method and apparatus, and a communication device.

According to a first aspect, a data transmission method is provided, applied to a first communication device, and the method including:

generating a desired guard symbol medium access control layer control element (MAC CE) in a case that a preset trigger condition is met; and sending the desired guard symbol MAC CE to a second communication device.

According to a second aspect, a data transmission apparatus is provided, performed by a first communication device, and the apparatus including:

a generation module, configured to generate a desired guard symbol medium access control layer control element (MAC CE) in a case that a preset trigger condition is met; and a sending module, configured to send the desired guard symbol MAC CE to a second communication device.

According to a third aspect, a communication device is provided, including a processor, a memory, and a program or instruction stored in the memory and executable on the processor, the program or instruction, when executed by the processor, implementing steps of the data transmission method according to the first aspect.

According to a fourth aspect, a readable storage medium is provided, storing a program or instruction, the program or instruction, when executed by a processor, implementing steps of the data transmission method according to the first aspect.

According to a fifth aspect, a chip is provided, including a processor and a communication interface, where the communication interface is coupled to the processor, and the processor is configured to run a program or instruction of a network-side device, to implement the data transmission method according to the first aspect.

In the embodiments of this application, the first communication device can generate a desired guard symbol MAC CE in a case that the preset trigger condition is met, and send the desired guard symbol MAC CE to the second communication device. In this way, the time for the communication device to generate and send the desired guard symbol MAC CE is clarified, ensuring that the first communication device can send the desired guard symbol MAC CE to the second communication device in time, which further ensures that the second communication device can configure a quantity of provided guard symbols for the first communication device in time, avoiding confusion in a transceiver state switching between the first communication device and the second communication device, and improving the transmission performance of the transmission link between the first communication device and the second communication device.

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguish by "first", "second", and the like are usually one type, and the number of objects is not limited. For example, the first object may be one or more than one. In addition, in the specification and the claims "and/or" means at least one of the connected objects, and the character "/" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a New Radio (NR) system for example objectives, and NR terms are used in most of the description below, although these technologies are also applicable to applications other than NR system applications, such as a 6th Generation (6G) communication system.

Figure 1:
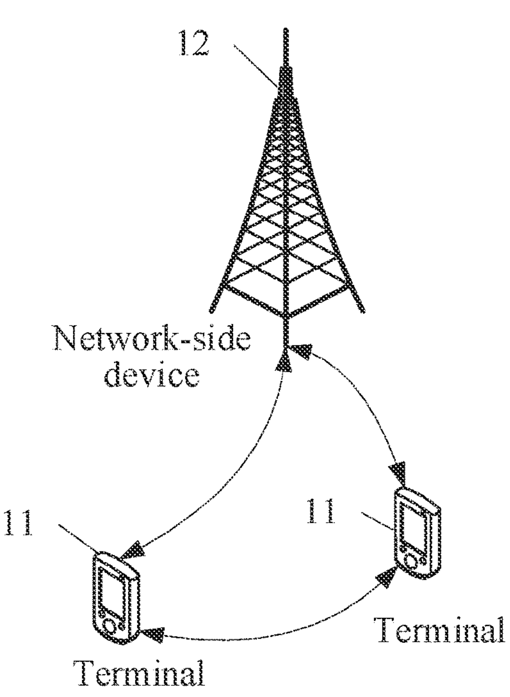
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network-side device 12. The terminal 11 may also be referred to as a terminal device or a User Equipment (UE). The terminal 11 may be a terminal-side device such as a mobile phone, a tablet personal computer, a laptop computer or referred to as a notebook computer, a Personal Digital Assistant (PDA), a palmtop computer, a netbook, an ultra-mobile personal computer (UMPC), a Mobile Internet Device (MID), a wearable, an in-vehicle device (VUE), or a pedestrian terminal (PUE). The wearable device includes: a bracelet, earphones, glasses, or the like. It should be noted that a specific type of the terminal 11 is not limited in this embodiment of this application. The network-side device 12 may be a base station or a core network. The base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a WLAN access point, a WiFi node, a Transmitting Receiving Point (TRP), or other appropriate terms in the field. As long as the same technical effect is achieved, the base station is not limited to a specific technical word. It should be noted that only a base station in an NR system is used as an example in this embodiment of this application, but a specific type of the base station is not limited.

To better understand this solution, some concepts involved in the data transmission method and apparatus, and the communication device provided in this embodiment of this application are first explained and described.

Figure 2A:
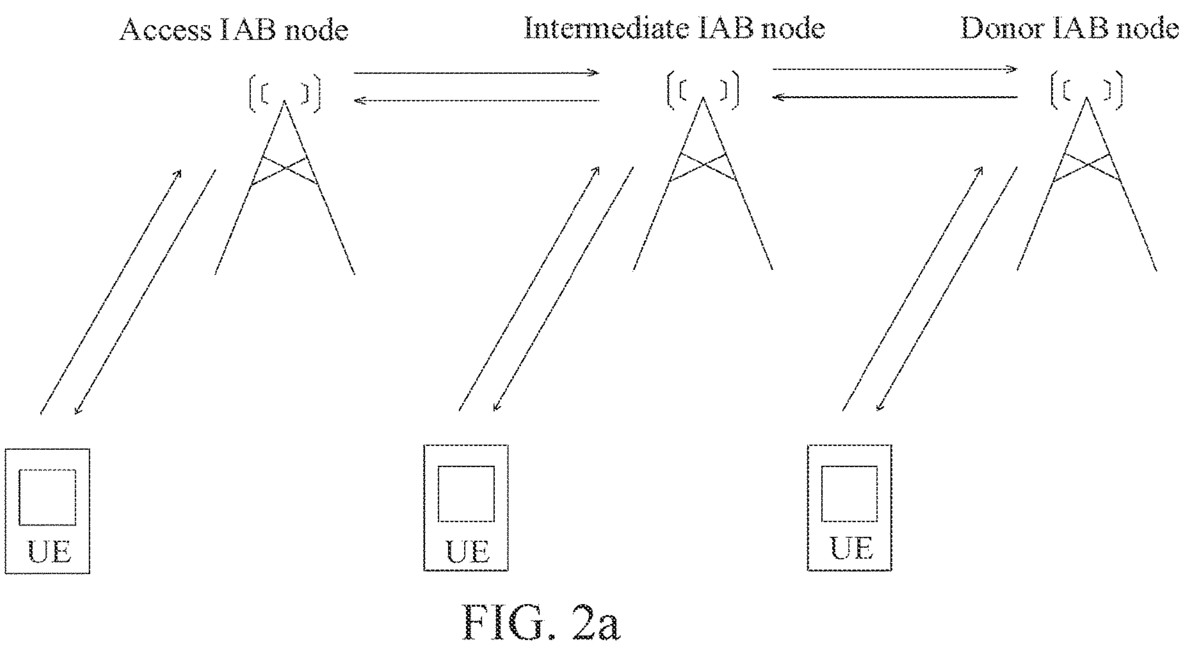
FIG. 2*a* is a block diagram of an IAB system to which an embodiment of this application is applicable.

FIG. 2*a* is a schematic diagram of an Integrated Access Backhaul (IAB) system. One IAB node includes a Distributed Unit (DU) function part and a Mobile Termination (MT) function part. Depending on the MT, one access point (that is, the IAB node in FIG. 2*a*) can find one uplink access point (parent IAB node), and establish a wireless connection with the DU of the uplink access point. The wireless connection is referred to as a backhaul link. After a complete backhaul link is established for one IAB node, the IAB node turns on a DU function thereof. The DU provides a cell service, that is, the DU can provide an access service for User Equipment (UE) and the IAB node. One integrated access backhaul loop includes one donor IAB node (or become an IAB donor), and the donor IAB node has a directly connected wired transmission network to provide loop transmission.

Figures 2B, 3:
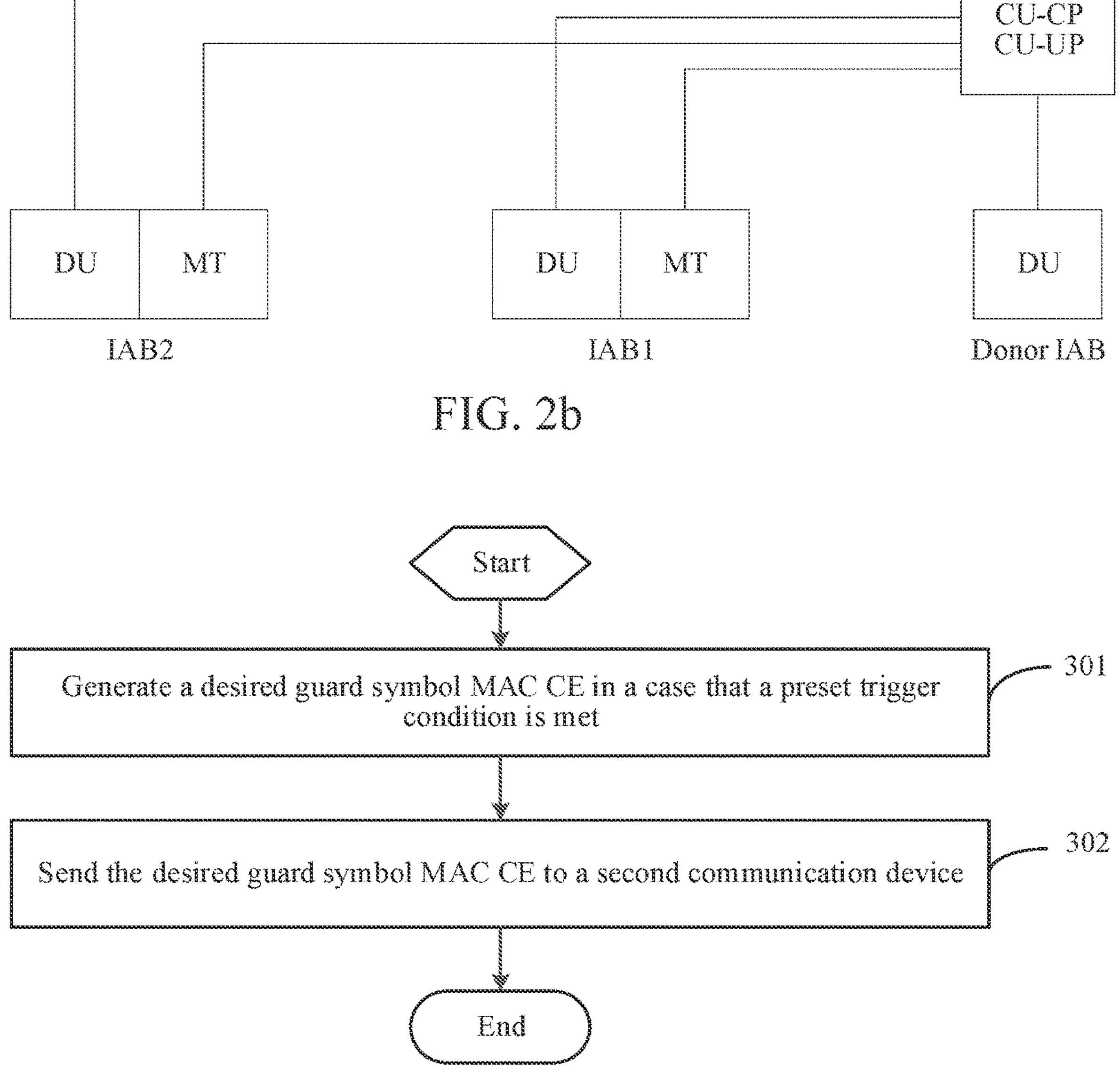
FIG. 2*b* is a structural diagram of a CU-DU in an IAB system to which an embodiment of this application is applicable.
FIG. 3 is a flowchart of a data transmission method according to an embodiment of this application.

FIG. 2*b* is a structural diagram of a Centralized Unit-Distributed Unit (CU-DU) in an IAB system. In an integrated access backhaul loop, DUs of all IAB nodes are all connected to a same CU node, and this node configures the DUs through an F1-AP protocol. The CU configures the MT through a Radio Resource Control (RRC) protocol. The donor IAB node does not have an MT function part. In a case that a wired transmission network is inadequate, that is, when there is no wired transmission, the access point may depend on wireless backhaul.

The data transmission method and apparatus, and the communication device provided in the embodiments of this application are described below through specific embodiments and application scenarios thereof with reference to the accompanying drawings.

FIG. 3 is a flowchart of a data transmission method according to an embodiment of this application, and the data transmission method is performed by a first communication device. As shown in FIG. 3, the data transmission method includes the following steps:

Step 301: Generate a desired guard symbol MAC CE in a case that a preset trigger condition is met.

For example, using an IAB system as an example, a Medium Access Control (MAC) Control Element (CE) can indicate 8 guard symbol values, respectively corresponding to a quantity of guard symbols in 8 state switching situations of DU sending (TX) being switched to MT TX, DU TX being switched to MT receiving (RX), DU RX being switched to MT TX, DU RX being switched to MT RX, MT TX being switched to DU TX, MT TX being switched to DU RX, MT RX being switched to DU TX, and MT RX being switched to DU RX.

In this embodiment of this application, the first communication device generates a desired guard symbol MAC CE in a case that the preset trigger condition is met. For example, the preset trigger condition may refer to a quantity of configured guard symbols of a first communication device does not match a quantity of desired guard symbols. In this case, the first communication device generates a desired guard symbol MAC CE, and the desired guard symbol MAC CE may indicate a quantity of the desired guard symbols of the first communication device. In some embodiments, the preset trigger condition may also be other cases, which may be described in detail in subsequent embodiments.

Step 302: Send the desired guard symbol MAC CE to a second communication device.

It may be understood that after generating a desired guard symbol MAC CE, the first communication device sends the desired guard symbol MAC CE to the second communication device, so as to trigger the second communication device to configure a quantity of desired guard symbols for the first communication device. In some embodiments, the second communication device may configure a quantity of actually available guard symbols for the first communication device through the provided guard symbol MAC CE.

In this embodiment of this application, the first communication device can generate a desired guard symbol MAC CE in a case that the preset trigger condition is met, and send the desired guard symbol MAC CE to the second communication device. In this way, the time for the communication device to generate and send the desired guard symbol MAC CE is clarified, ensuring that the first communication device can send the desired guard symbol MAC CE to the second communication device in time, which further ensures that the second communication device can configure a quantity of provided guard symbols for the first communication device in time, avoiding confusion in a transceiver state switching between the first communication device and the second communication device, and improving the transmission performance of the transmission link between the first communication device and the second communication device.

It should be noted that the data transmission method provided in this embodiment of this application is applicable to an IAB system. Both the first communication device and the second communication device are IAB nodes in the IAB system, for example, the first communication device is a child IAB node, and the second communication device is a parent IAB node. In some embodiments, the data transmission method is further applicable to a sidelink system. Both the first communication device and the second communication device are sidelink UEs in the sidelink system, for example, the first communication device is a first sidelink UE, and the second communication device is a second sidelink UE. The solutions provided in this embodiment of this application are illustrated below for the above two application scenarios.

In some embodiments, using an IAB system as an example, the step 301 may include any one of the following:

generating, in a case that a child IAB node initially accesses a parent IAB node, a desired guard symbol MAC CE corresponding to a primary cell by the child IAB node;

generating, in a case that a child IAB node accesses a secondary parent IAB node, a desired guard symbol MAC CE corresponding to a primary secondary cell by the child IAB node;

generating, in a case that a new secondary cell is configured for a child IAB node, a desired guard symbol MAC CE corresponding to a primary secondary cell by the child IAB node;

generating, after one secondary cell of a child IAB node is activated, a desired guard symbol MAC CE corresponding to the activated secondary cell by the child IAB node;

generating, in a case that a child IAB node is switched to a new parent IAB node, a desired guard symbol MAC CE corresponding to a serving cell of the new parent IAB node by the child IAB node;

generating, in a case that a radio link failure occurs between a first IAB node and a corresponding parent IAB node, and the first IAB node is successfully reconnected, a desired guard symbol MAC CE corresponding to a reconnected serving cell by the first IAB node;

generating, in a case that a quantity of configured guard symbols of a target cell of an IAB node does not match a quantity of desired guard symbols, a desired guard symbol MAC CE of the target cell by the IAB node;

generating, in a case that a preset multiplexing manner is configured for or unconfigured for an IAB node, a desired guard symbol MAC CE corresponding to a serving cell for which the preset multiplexing manner is configured by the IAB node;

generating, in a case that an IAB node receives query information for a guard symbol sent by a corresponding parent IAB node, a desired guard symbol MAC CE based on the query information by the IAB node;

generating, in a case that a frequency band accessed by an IAB node meets a preset condition, a desired guard symbol MAC CE by the IAB node;

generating, in a case that a first cell of an IAB node is located in a first frequency band, the first cell is configured or activated, and all other pre-configured or activated cells of the IAB node are located in a second frequency band, a desired guard symbol MAC CE corresponding to the first cell by the IAB node; or generating, in a case that a first cell of an IAB node is configured or activated, the first cell is located in a third frequency band, and before the first cell is configured or activated, no cell is configured or activated in the third frequency band, a desired guard symbol MAC CE corresponding to the first cell by the IAB node.

The implementations provided above are illustrated below.

In the implementation 1, the first communication device is a child IAB node, the second communication device is a parent IAB node, and the preset trigger condition is that in a case that a child IAB node initially accesses a parent IAB-DU, the child IAB node generates a desired guard symbol MAC CE corresponding to a primary cell, and can send the desired guard symbol MAC CE to the parent IAB node, so that the parent IAB node can configure a quantity of provided guard symbols for the child IAB node based on the desired guard symbol MAC CE.

It should be noted that the child IAB node in this implementation may be a parent IAB node in another scenario, the parent IAB node may be a child IAB node in another scenario, and the above description is also applicable to the child IAB node and parent IAB node in another implementation, and details are not described again subsequently.

In the implementation 2, the first communication device is a child IAB node, the second communication device is a parent IAB node, when the child IAB node accesses a secondary IAB node (that is, a secondary parent IAB node), that is, the child IAB node meets the preset trigger condition, the child IAB node generates a desired guard symbol MAC CE corresponding to a primary secondary cell, and can send the desired guard symbol MAC CE to the secondary IAB node, so that the secondary IAB node can configure a quantity of provided guard symbols for the child IAB node based on the desired guard symbol MAC CE.

In the implementation 3, the preset trigger condition is that a new secondary cell is configured for a child IAB node, then the child IAB node generates a desired guard symbol MAC CE corresponding to a primary secondary cell, and can send the desired guard symbol MAC CE to a corresponding parent IAB node, so that the parent IAB node configures a quantity of provided guard symbols for the child IAB node. In this implementation, the first communication device is a child IAB node, and the second communication device is a parent IAB node.

In the implementation 4, the first communication device is a child IAB node, the second communication device is a parent IAB node, and the preset trigger condition is that one secondary cell of the child IAB node is activated, so the child IAB node generates a desired guard symbol MAC CE corresponding to the activated secondary cell, and sends the desired guard symbol MAC CE to a corresponding parent IAB node.

In the implementation 5, the first communication device is a child IAB node, the second communication device is a parent IAB node, when the child IAB node is switched (handover) to a new parent IAB-DU, that is, the child IAB node meets the preset trigger condition, the child IAB node generates a desired guard symbol MAC CE corresponding to a serving cell of the new parent IAB node, and can send the desired guard symbol MAC CE to a corresponding parent IAB node.

In the implementation 6, when a Radio Link Failure (RLF) occurs on a backhaul link between an IAB node and a parent IAB-DU, and the IAB node is successfully reconnected, the IAB node generates a desired guard symbol MAC CE corresponding to a reconnected serving cell, and sends the desired guard symbol MAC CE to the successfully reconnected parent IAB node. It should be noted that the successful reconnection of the IAB node may refer to the successful reconnection of the IAB node with the parent IAB node where the RLF occurs, or the successful reconnection of the IAB node with another parent IAB node.

In the implementation 7, when a quantity of configured guard symbols of a target cell of an IAB node does not match a quantity of desired guard symbols, the IAB node generates a desired guard symbol MAC CE of the target cell. For example, when a distance between an IAB node and a parent IAB node thereof changes, and due to a change in the wireless signal transmission delay, a quantity of desired guard symbols of the IAB node changes, which may further be likely to cause a quantity of configured guard symbols of a cell of the IAB node does not match a quantity of desired guard symbols. In this case, the IAB node is triggered to generate a desired guard symbol MAC CE corresponding to the cell, and send the desired guard symbol MAC CE to a corresponding parent IAB node. It can be understood that the target cell may be any cell of the IAB node, and is not a specified one.

In the implementation 8, when a preset multiplexing manner is configured for or unconfigured for an IAB node, the IAB node is triggered to generate a desired guard symbol MAC CE corresponding to a serving cell for which the preset multiplexing manner is configured, and can send the desired guard symbol MAC CE to a corresponding parent IAB node.

In some embodiments, the preset multiplexing manner includes any one of the following:

space division multiplexing of an uplink and a downlink;

frequency division multiplexing of an uplink and a downlink;

full-frequency and full-time multiplexing of an uplink and a downlink; or time division multiplexing of an uplink and a downlink.

It should be noted that in the IAB system, the full-frequency and full-time multiplexing of the uplink and the downlink may refer to MT RX and DU TX, or may refer to MT TX and DU RX.

In the implementation 9, when an IAB node receives query information about guard symbols sent by a parent IAB node, the IAB node is triggered to generate a desired guard symbol MAC CE based on the query information, and send the desired guard symbol MAC CE to a corresponding parent IAB node. For example, the query information may be that a parent IAB node queries about a quantity of desired guard symbols of the IAB node. Based on the query information, the IAB node generates a desired guard symbol MAC CE, and the desired guard symbol MAC CE includes the quantity of desired guard symbols of the IAB node.

In some embodiments, the query information is sent through any one of the following:

a MAC CE;

a Physical downlink control channel (PDCCH);

a control Protocol Data Unit (PDU); or

Radio Resource Control (RRC) signaling.

In the implementation 10, when a frequency band accessed by an IAB node meets the preset condition, the IAB node may also be triggered to generate a desired guard symbol MAC CE, and send the generated desired guard symbol MAC CE to a corresponding parent LAB node. For example, when the frequency band accessed by the IAB node is a preset frequency band, the IAB node generates a desired guard symbol MAC CE.

In the implementation 11, when a new cell (that is, a first cell) in a first frequency band of an IAB node is configured or activated, and all other pre-configured or activated cells of the IAB node are in a second frequency band, the IAB node generates a desired guard symbol MAC CE corresponding to the new cell, and sends the generated desired guard symbol MAC CE to a corresponding parent IAB node. The second frequency band is FR2 in a case that the first frequency band is FR1 (Frequency Range 1); and the second frequency band is FR1 in a case that the first frequency band is FR2.

For example, when a new cell in the FR2 frequency band of an IAB node is configured or activated, and all other pre-configured or activated cells are in the FR1, the IAB node generates a desired guard symbol MAC CE corresponding to the new cell. In some embodiments, when a new cell in the FR1 frequency band of an IAB node is configured or activated, and all other pre-configured or activated cells are in the FR2, the IAB node generates a desired guard symbol MAC CE corresponding to the new cell.

In the implementation 12, when a new cell (that is, a first cell) in a new frequency band (that is, a third frequency band) of an IAB node is configured or activated, and before the new cell is configured or activated, no cell is configured or activated in the new frequency band, the IAB node generates a desired guard symbol MAC CE corresponding to the new cell, and sends the desired guard symbol MAC CE to a corresponding parent IAB node.

In the foregoing implementation, the preset trigger conditions for generating the desired guard symbol MAC CE by the IAB node are respectively defined, which further clarifies when the desired guard symbol MAC CE is generated by the IAB node in the IAB system, so as to ensure that the quantity of the guard symbols can be configured or reconfigured in time, avoiding confusion in a transceiver state switching between a MT and a DU of the IAB node, and ensuring the transmission performance of the backhaul link in the IAB system.

It should be noted that in the foregoing implementation, the first communication device is a child IAB node, and the second communication device is a parent IAB node.

In some embodiments, when the data transmission method is performed by a sidelink system, the step 301 may include any one of the following:

generating, in a case that a first sidelink UE sends target information to a connected second sidelink UE, a desired guard symbol MAC CE based on the target information by the first sidelink UE; or generating, in a case that a quantity of desired guard symbols of a first sidelink UE changes, a desired guard symbol MAC CE, where the desired guard symbol MAC CE includes the quantity of desired guard symbols of the first sidelink UE.

In the first implementation, when the first sidelink UE sends target information, for example, query information, to another sidelink UE (that is, the second sidelink UE) connected thereto, the first sidelink UE can generate a desired guard symbol MAC CE based on the target information, and send the generated desired guard symbol MAC CE to the second sidelink UE.

The target information includes any one of the following:

a quantity of desired guard symbols for querying the second sidelink UE; or a quantity of desired guard symbols for determining the first sidelink UE.

For example, the target information is query information, that is, the first sidelink UE sends the query information to the second sidelink UE, to query the quantity of desired guard symbols of the second sidelink UE, so that the first sidelink UE generates a desired guard symbol MAC CE based on the query information, where the desired guard symbol MAC CE may include the quantity of the desired guard symbols of the second sidelink UE.

In some embodiments, the first sidelink UE sends the quantity of desired guard symbols thereof to the second sidelink UE connected thereto, that is, sends the quantity of desired guard symbols of the first sidelink UE to the second sidelink UE, so that the first sidelink UE can correspondingly generate a desired guard symbol MAC CE, where the desired guard symbol MAC CE includes the quantity of desired guard symbols of the first sidelink UE.

In the second implementation, when a sidelink UE (for example, the first sidelink UE) detects that a quantity of the desired guard symbols thereof changes, the sidelink UE generates a desired guard symbol MAC CE, and sends the generated desired guard symbol MAC CE to another sidelink UE (the second sidelink UE) connected thereto, and the desired guard symbol MAC CE includes the quantity of desired guard symbols of the first sidelink UE, so that the second sidelink UE can configure a quantity of provided guard symbols for the first sidelink UE based on the desired guard symbol MAC CE, to ensure the performance of the transmission link between the sidelink UEs.

In the sidelink system, by generating a desired guard symbol MAC CE, the sidelink UEs can notify each other of quantities of the desired guard symbols, so as to improve the transmission performance of the sidelink system.

In this embodiment of this application, after generating a desired guard symbol MAC CE, the first communication device can send the desired guard symbol MAC CE to the second communication device. In some embodiments, the step 302 includes any one of the following:

sending the desired guard symbol MAC CE to the second communication device through an uplink transmission permission; or sending the desired guard symbol MAC CE to the second communication device through a Scheduling Request (SR).

That is, the first communication device may send the desired guard symbol MAC CE to the second communication device through the uplink transmission permission or SR. For example, the first communication device may preferentially select an uplink transmission permission to send. In a case that there is no available uplink transmission permission, an SR may be triggered to send, and different sending methods are used to ensure that the desired guard symbol MAC CE can be sent to the second communication device in time.

In this embodiment of this application, a quantity of the desired guard symbol MAC CEs may be at least one. In a case that a quantity of the desired guard symbol MAC CEs is greater than one, the step 302 may include:

sending the desired guard symbol MAC CEs to the second communication device based on a preset priority order.

That is, when there is more than one desired guard symbol MAC CEs generated by the first communication device, the first communication device may send the desired guard symbol MAC CEs based on the preset priority order, so as to avoid transmission confusion.

In some embodiments, the preset priority order includes any one of the following:

a priority of a licensed frequency cell is higher than a priority of an unlicensed frequency cell; or a priority of a cell located in a first frequency band is higher than a priority of a cell located in a second frequency band, where the first frequency band is FR1, and the second frequency band is FR2.

In an implementation, after generating a plurality of desired guard symbol MAC CEs, the first communication device may preferentially send the desired guard symbol MAC CEs corresponding to a licensed frequency cell to the second communication device, and then send the desired guard symbol MAC CEs corresponding to an unlicensed frequency cell. The licensed frequency cell refers to a cell with access to a licensed frequency band, and the unlicensed frequency cell refers to a cell with access to an unlicensed frequency band. Specific frequency band ranges of the licensed frequency band and the unlicensed frequency band can refer to related technologies.

In another implementation, after generating a plurality of desired guard symbol MAC CEs, the first communication device may preferentially send the desired guard symbol MAC CEs corresponding to a cell located in the FR1 frequency band to the second communication device, and then send the desired guard symbol MAC CEs corresponding to a cell located in the FR2 frequency band.

In this embodiment of this application, when there are a plurality of desired guard symbol MAC CEs generated by the first communication device, the plurality of desired guard symbol MAC CEs are sent in order through a preset priority order, thereby avoiding transmission confusion between the first communication device and the second communication device, and ensuring that the second communication device can orderly configure a quantity of the guard symbols based on a receiving order of the desired guard symbol MAC CEs, which further avoids confusion in a transceiver state switching between the first communication device and the second communication device, and improves the transmission performance of the transmission link between the first communication device and the second communication device.

It should be noted that the data transmission method provided in this embodiment of this application may be executed by a data transmission apparatus, or a control module configured to execute the data transmission method in the data transmission apparatus. In this embodiment of this application, an example in which the data transmission apparatus executes the data transmission method is used to illustrate the data transmission apparatus provided in this embodiment of this application.

Figure 4:
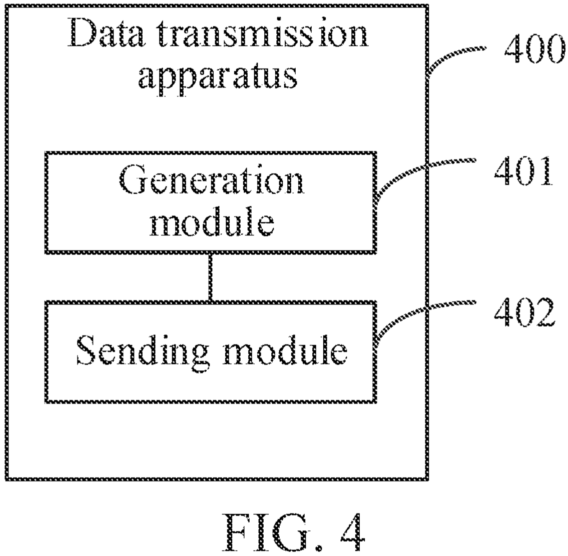
FIG. 4 is a structural diagram of a data transmission apparatus according to an embodiment of this application.

FIG. 4 is a structural diagram of a data transmission apparatus according to an embodiment of this application, and the data transmission apparatus is performed by a first communication device. As shown in FIG. 4, the data transmission apparatus 400 includes:

a generation module 401, configured to generate a desired guard symbol medium access control layer control element (MAC CE) in a case that a preset trigger condition is met; and a sending module 402, configured to send the desired guard symbol MAC CE to a second communication device.

In some embodiments, both the first communication device and the second communication device are integrated access backhaul (IAB) nodes.

In some embodiments, the generation module 401 is further configured to implement any one of the following:

generating, in a case that a child IAB node initially accesses a parent IAB node, a desired guard symbol MAC CE corresponding to a primary cell;

generating, in a case that a child IAB node accesses a secondary parent IAB node, a desired guard symbol MAC CE corresponding to a primary secondary cell;

generating, in a case that a new secondary cell is configured for a child IAB node, a desired guard symbol MAC CE corresponding to a primary secondary cell;

generating, after one secondary cell of a child IAB node is activated, a desired guard symbol MAC CE corresponding to the activated secondary cell;

generating, in a case that a child IAB node is switched to a new parent IAB node, a desired guard symbol MAC CE corresponding to a serving cell of the new parent IAB node;

generating, in a case that a radio link failure occurs between a first IAB node and a corresponding parent IAB node, and the first IAB node is successfully reconnected, a desired guard symbol MAC CE corresponding to a reconnected serving cell;

generating, in a case that a quantity of configured guard symbols of a target cell of an IAB node does not match a quantity of desired guard symbols, a desired guard symbol MAC CE of the target cell;

generating, in a case that a preset multiplexing manner is configured for or unconfigured for an IAB node, a desired guard symbol MAC CE corresponding to a serving cell for which the preset multiplexing manner is configured;

generating, in a case that an IAB node receives query information for a guard symbol sent by a corresponding parent IAB node, a desired guard symbol MAC CE based on the query information;

generating, in a case that a frequency band accessed by an IAB node meets a preset condition, a desired guard symbol MAC CE;

generating, in a case that a first cell of an IAB node is located in a first frequency band, the first cell is configured or activated, and all other pre-configured or activated cells of the IAB node are located in a second frequency band, a desired guard symbol MAC CE corresponding to the first cell; or generating, in a case that a first cell of an IAB node is configured or activated, the first cell is located in a third frequency band, and before the first cell is configured or activated, no cell is configured or activated in the third frequency band, a desired guard symbol MAC CE corresponding to the first cell.

In some embodiments, the preset multiplexing manner includes any one of the following:

space division multiplexing of an uplink and a downlink;

frequency division multiplexing of an uplink and a downlink;

full-frequency and full-time multiplexing of an uplink and a downlink; or time division multiplexing of an uplink and a downlink.

In some embodiments, the query information is sent through any one of the following:

a MAC CE;

a physical downlink control channel (PDCCH);

a control protocol data unit (PDU); or radio resource control (RRC) signaling.

In some embodiments, the second frequency band is FR2 in a case that the first frequency band is FR1; and the second frequency band is FR1 in a case that the first frequency band is FR2.

In some embodiments, the sending module 402 is further configured to:

send the desired guard symbol MAC CE to the second communication device through an uplink transmission permission;

or send the desired guard symbol MAC CE to the second communication device through a scheduling request SR.

In some embodiments, in a case that there is more than one desired guard symbol MAC CEs, the sending module 402 is further configured to:

send the desired guard symbol MAC CEs to the second communication device based on a preset priority order.

In some embodiments, the preset priority order includes any one of the following:

a priority of a licensed frequency cell is higher than a priority of an unlicensed frequency cell; or a priority of a cell located in a first frequency band is higher than a priority of a cell located in a second frequency band, where the first frequency band is FR1, and the second frequency band is FR2.

In some embodiments, both the first communication device and the second communication device are sidelink terminals UEs; and the generation module 401 is further configured to implement any one of the following:

generating, in a case that a first sidelink UE sends target information to a connected second sidelink UE, a desired guard symbol MAC CE based on the target information by the first sidelink UE; or generating, in a case that a quantity of desired guard symbols of a first sidelink UE changes, a desired guard symbol MAC CE, where the desired guard symbol MAC CE includes the quantity of desired guard symbols of the first sidelink UE.

In some embodiments, the target information includes any one of the following:

a quantity of desired guard symbols for querying the second sidelink UE; or a quantity of desired guard symbols for determining the first sidelink UE.

In this embodiment of this application, the data transmission apparatus 400 can generate a desired guard symbol MAC CE in a case that the preset trigger condition is met, and send the desired guard symbol MAC CE to the second communication device. In this way, the time for the data transmission apparatus 400 to generate and send the desired guard symbol MAC CE is clarified, to ensure that the data transmission apparatus 400 can send the desired guard symbol MAC CE to the second communication device in time, which further ensures that the second communication device can configure a quantity of provided guard symbols for the data transmission apparatus 400 in time, avoiding confusion in a transceiver state switching between the communication devices, and improving the transmission performance of the transmission link between the communication devices.

The data transmission apparatus 400 in this embodiment of this application may be an apparatus, or may be a component, an integrated circuit, or a chip in a terminal. The apparatus may be a mobile terminal or may be a non-mobile terminal. For example, the mobile terminal may include but is not limited to the types of the terminal 11 listed above, and the non-mobile terminal may be a server, a Network Attached Storage (NAS), a personal computer (PC), a television (TV), a teller machine, a self-service machine, or the like. This is not limited in this embodiment of the present application.

The data transmission apparatus 400 in this embodiment of this application may be an apparatus having an operating system. The operating system may be an Android operating system, an IOS operating system, or another possible operating system. This is not limited in the embodiments of this application.

The data transmission apparatus 400 provided in this embodiment of this application can implement all processes implemented by the foregoing embodiments of the data transmission method, and can achieve the same technical effects. To avoid repetition, details are not described herein again.

Figure 5:
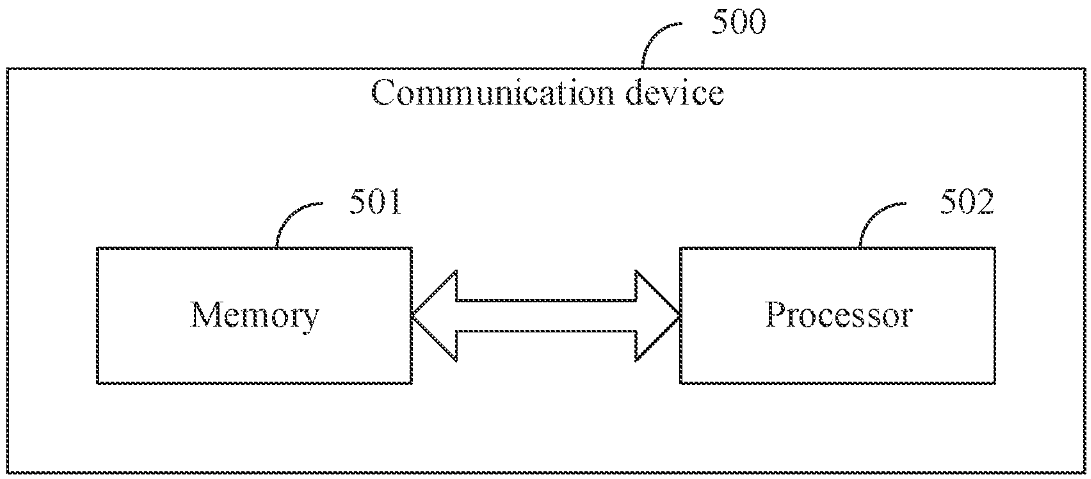
FIG. 5 is a structural diagram of a communication device according to an embodiment of this application.

In some embodiments, as shown in FIG. 5, an embodiment of this application further provides a communication device 500, including a processor 501, a memory 502, and a program or instruction stored on the memory 502 and executable on the processor 501. The program or instruction, when executed by the processor 501, implements all processes of the foregoing embodiments of the data transmission method, and can achieve the same technical effects. To avoid repetition, details are not described herein again.

An embodiment of this application further provides a readable storage medium, storing a program or instruction. The program or instruction, when executed by a processor, implements all processes of the foregoing embodiments of the data transmission method, and can achieve the same technical effects. To avoid repetition, details are not described herein again.

The processor is the processor in the terminal in the foregoing embodiments. The readable storage medium includes a computer-readable storage medium, for example, a computer Read-Only Memory (ROM), a Random Access Memory (RAM), a magnetic disk, an optical disc, or the like.

An embodiment of this application further provides a chip, including: a processor and a communication interface, where the communication interface is coupled to the processor, and the processor is configured to run a program or instruction of a network-side device, to implement all processes of the foregoing embodiments of the data transmission method in FIG. 3, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product, stored in a non-volatile storage medium and configured to be executed by at least one processor to implement all processes of the foregoing embodiments of the data transmission method in FIG. 3, and can achieve the same technical effects. To avoid repetition, details are not described herein again.

It may be understood that, the embodiments described in the present disclosure may be implemented by using software, hardware, firmware, middleware, microcode, or a combination thereof. For hardware implementation, modules, units, submodules, and subunits may be implemented by one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions described in this application, or a combination of the above.

It should be noted that the terms “include”, “comprise”, or any other variation thereof in this specification is intended to cover a non-exclusive inclusion, making a process, method, article or apparatus including a series of elements include not only those elements, but also other elements not expressly listed, or further elements inherent to such process, method, article or apparatus. Without more limitations, elements defined by the sentence “including one” does not exclude that there are still other same elements in the processes, methods, objects, or apparatuses. In addition, it should be noted that, the scopes of the method and apparatus in the implementations of this application are not limited to performing functions in the order shown or discussed, and further includes performing the functions in a substantially simultaneous manner or in reverse order according to the functions involved. For example, the described method may be performed according to a sequence different from the described sequence, and various steps may further be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and may further be implemented by hardware. Based on such understanding, the technical solutions of this application or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner a network device, or the like) to perform the methods in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art may make many forms without departing from the idea of this application and the scope of protection of the claims. All of the forms fall within the protection of this application.

What is claimed is:

1. A data transmission method, performed by a first communication device, comprising:

generating a desired guard symbol medium access control layer control element (MAC CE) when a preset trigger condition is met; and sending the desired guard symbol MAC CE to a second communication device, wherein both the first communication device and the second communication device are integrated access backhaul (IAB) nodes, wherein the generating the desired guard symbol MAC CE when the preset trigger condition is met comprises:

the generating, when a first cell of an IAB node is configured or activated, the first cell is located in a third frequency band, and before the first cell is configured or activated, no cell is configured or activated in the third frequency band, the desired guard symbol MAC CE corresponding to the first cell by the IAB node.

2. The data transmission method according to claim 1, wherein the generating the desired guard symbol MAC CE when the preset trigger condition is met further comprises any one of the following:

the generating, when a radio link failure occurs between a first IAB node and a corresponding parent IAB node, and the first IAB node is successfully reconnected, the desired guard symbol MAC CE corresponding to a reconnected serving cell by the first IAB node;

the generating, when a child IAB node initially accesses a parent IAB node, the desired guard symbol MAC CE corresponding to a primary cell by the child IAB node;

the generating, when the child IAB node accesses a secondary parent IAB node, the desired guard symbol MAC CE corresponding to a primary secondary cell by the child IAB node;

the generating, when a new secondary cell is configured for the child IAB node, the desired guard symbol MAC CE corresponding to a primary secondary cell by the child IAB node;

the generating, after one secondary cell of the child IAB node is activated, the desired guard symbol MAC CE corresponding to the activated secondary cell by the child IAB node;

the generating, when the child IAB node is switched to a new parent IAB node, the desired guard symbol MAC CE corresponding to a serving cell of the new parent IAB node by the child IAB node;

the generating, when a quantity of configured guard symbols of a target cell of an IAB node does not match a quantity of desired guard symbols, the desired guard symbol MAC CE of the target cell by the IAB node; or the generating, when a frequency band accessed by the IAB node meets a preset condition, the desired guard symbol MAC CE by the IAB node.

3. The data transmission method according to claim 1, wherein the generating the desired guard symbol MAC CE when the preset trigger condition is met further comprises:

the generating, when a preset multiplexing manner is configured for or unconfigured for the IAB node, the desired guard symbol MAC CE corresponding to a serving cell for which the preset multiplexing manner is configured by the IAB node, wherein the preset multiplexing manner comprises any one of the following:

space division multiplexing of an uplink and a downlink;

frequency division multiplexing of an uplink and a downlink;

full-frequency and full-time multiplexing of an uplink and a downlink; or time division multiplexing of an uplink and a downlink.

4. The data transmission method according to claim 2, wherein the generating the desired guard symbol MAC CE when the preset trigger condition is met further comprises:

the generating, when the IAB node receives query information for a guard symbol sent by the corresponding parent IAB node, the desired guard symbol MAC CE based on the query information by the IAB node, wherein the query information is sent through any one of the following:

a MAC CE;

a physical downlink control channel (PDCCH);

a control protocol data unit (PDU); or radio resource control (RRC) signaling.

5. The data transmission method according to claim 1, wherein the generating the desired guard symbol MAC CE when the preset trigger condition is met further comprises:

the generating, when the first cell of the IAB node is located in a first frequency band, the first cell is configured or activated, and all other pre-configured or activated cells of the IAB node are located in a second frequency band, the desired guard symbol MAC CE corresponding to the first cell by the IAB node, wherein the second frequency band is FR2 when the first frequency band is FR1; and the second frequency band is FR1 when the first frequency band is FR2.

6. The data transmission method according to claim 1, wherein the sending the desired guard symbol MAC CE to the second communication device comprises any one of the following:

the sending the desired guard symbol MAC CE to the second communication device through an uplink transmission permission; or the sending the desired guard symbol MAC CE to the second communication device through a scheduling request (SR).

7. The data transmission method according to claim 1, wherein when there is more than one desired guard symbol MAC CEs, the sending the desired guard symbol MAC CE to the second communication device comprises:

the sending the desired guard symbol MAC CEs to the second communication device based on a preset priority order.

8. The data transmission method according to claim 7, wherein the preset priority order comprises any one of the following:

a priority of a licensed frequency cell is higher than a priority of an unlicensed frequency cell; or a priority of a cell located in a first frequency band is higher than a priority of a cell located in a second frequency band, wherein the first frequency band is FR1, and the second frequency band is FR2.

9. The data transmission method according to claim 1, wherein both the first communication device and the second communication device are sidelink UEs, and generating the desired guard symbol MAC CE when the preset trigger condition is met comprises any one of the following:

the generating, when a first sidelink UE sends target information to a connected second sidelink UE, the desired guard symbol MAC CE based on the target information by the first sidelink UE; or the generating, when a quantity of desired guard symbols of a first sidelink UE changes, the desired guard symbol MAC CE, wherein the desired guard symbol MAC CE comprises the changed quantity of desired guard symbols of the first sidelink UE.

10. The data transmission method according to claim 9, wherein the target information comprises any one of the following:

a quantity of desired guard symbols for querying the second sidelink UE; or a quantity of desired guard symbols for determining the first sidelink UE.

11. A communication device, wherein the communication device is a first communication device, comprising:

a memory storing a computer program; and a processor coupled to the memory and configured to execute the computer program to perform operations comprising:

generating a desired guard symbol medium access control layer control element (MAC CE) when a preset trigger condition is met; and sending the desired guard symbol MAC CE to a second communication device, wherein both the first communication device and the second communication device are integrated access backhaul (IAB) nodes, wherein the generating the desired guard symbol MAC CE when the preset trigger condition is met comprises:

the generating, when a first cell of an IAB node is configured or activated, the first cell is located in a third frequency band, and before the first cell is configured or activated, no cell is configured or activated in the third frequency band, the desired guard symbol MAC CE corresponding to the first cell by the IAB node.

12. The communication device according to claim 11, wherein the generating the desired guard symbol MAC CE when the preset trigger condition is met comprises any one of the following:

the generating, when a radio link failure occurs between a first IAB node and a corresponding parent IAB node, and the first IAB node is successfully reconnected, the desired guard symbol MAC CE corresponding to a reconnected serving cell by the first IAB node;

the generating, when a child IAB node initially accesses a parent IAB node, the desired guard symbol MAC CE corresponding to a primary cell by the child IAB node;

the generating, when the child IAB node accesses a secondary parent IAB node, the desired guard symbol MAC CE corresponding to a primary secondary cell by the child IAB node;

the generating, when a new secondary cell is configured for the child IAB node, the desired guard symbol MAC CE corresponding to a primary secondary cell by the child IAB node;

the generating, after one secondary cell of the child IAB node is activated, the desired guard symbol MAC CE corresponding to the activated secondary cell by the child IAB node;

the generating, when the child IAB node is switched to a new parent IAB node, the desired guard symbol MAC CE corresponding to a serving cell of the new parent IAB node by the child IAB node;

the generating, when a quantity of configured guard symbols of a target cell of an IAB node does not match a quantity of desired guard symbols, the desired guard symbol MAC CE of the target cell by the IAB node; or the generating, when a frequency band accessed by the IAB node meets a preset condition, the desired guard symbol MAC CE by the IAB node.

13. The communication device according to claim 11, wherein the generating the desired guard symbol MAC CE when the preset trigger condition is met further comprises:

the generating, when a preset multiplexing manner is configured for or unconfigured for the IAB node, the desired guard symbol MAC CE corresponding to a serving cell for which the preset multiplexing manner is configured by the IAB node, wherein the preset multiplexing manner comprises any one of the following:

space division multiplexing of an uplink and a downlink;

frequency division multiplexing of an uplink and a downlink;

full-frequency and full-time multiplexing of an uplink and a downlink; or time division multiplexing of an uplink and a downlink.

14. The communication device according to claim 12, wherein the generating the desired guard symbol MAC CE when the preset trigger condition is met further comprises:

the generating, when the IAB node receives query information for a guard symbol sent by the corresponding parent IAB node, the desired guard symbol MAC CE based on the query information by the IAB node, wherein the query information is sent through any one of the following:

a MAC CE;

a physical downlink control channel (PDCCH);

a control protocol data unit (PDU); or radio resource control (RRC) signaling.

15. The communication device according to claim 11, wherein the generating the desired guard symbol MAC CE when the preset trigger condition is met further comprises:

the generating, when the first cell of the IAB node is located in a first frequency band, the first cell is configured or activated, and all other pre-configured or activated cells of the IAB node are located in a second frequency band, the desired guard symbol MAC CE corresponding to the first cell by the IAB node, wherein the second frequency band is FR2 when the first frequency band is FR1; and the second frequency band is FR1 when the first frequency band is FR2.

16. A non-transitory computer-readable storage medium, storing a computer program to be executed by a processor of a first communication device, wherein the computer program, when executed by the processor of the first communication device, causes the processor to perform operations comprising:

generating a desired guard symbol medium access control layer control element (MAC CE) when a preset trigger condition is met; and sending the desired guard symbol MAC CE to a second communication device, wherein both the first communication device and the second communication device are integrated access backhaul (IAB) nodes, wherein the generating the desired guard symbol MAC CE when the preset trigger condition is met comprises:

the generating, when a first cell of an IAB node is configured or activated, the first cell is located in a third frequency band, and before the first cell is configured or activated, no cell is configured or activated in the third frequency band, the desired guard symbol MAC CE corresponding to the first cell by the IAB node.

17. The non-transitory computer-readable storage medium according to claim 16, wherein the generating the desired guard symbol MAC CE when the preset trigger condition is met comprises any one of the following:

the generating, when a radio link failure occurs between a first IAB node and a corresponding parent IAB node, and the first IAB node is successfully reconnected, the desired guard symbol MAC CE corresponding to a reconnected serving cell by the first IAB node;

the generating, when a child IAB node initially accesses a parent IAB node, the desired guard symbol MAC CE corresponding to a primary cell by the child IAB node;

the generating, when the child IAB node accesses a secondary parent IAB node, the desired guard symbol MAC CE corresponding to a primary secondary cell by the child IAB node;

the generating, when a new secondary cell is configured for the child IAB node, the desired guard symbol MAC CE corresponding to a primary secondary cell by the child IAB node;

the generating, after one secondary cell of the child IAB node is activated, the desired guard symbol MAC CE corresponding to the activated secondary cell by the child IAB node;

the generating, when the child IAB node is switched to a new parent IAB node, the desired guard symbol MAC CE corresponding to a serving cell of the new parent IAB node by the child IAB node;

the generating, when a quantity of configured guard symbols of a target cell of an IAB node does not match a quantity of desired guard symbols, the desired guard symbol MAC CE of the target cell by the IAB node; or the generating, when a frequency band accessed by the IAB node meets a preset condition, the desired guard symbol MAC CE by the IAB node.

18. The non-transitory computer-readable storage medium according to claim 17, wherein the generating the desired guard symbol MAC CE when the preset trigger condition is met further comprises:

the generating, when a preset multiplexing manner is configured for or unconfigured for the IAB node, the desired guard symbol MAC CE corresponding to a serving cell for which the preset multiplexing manner is configured by the IAB node, wherein the preset multiplexing manner comprises any one of the following:

space division multiplexing of an uplink and a downlink;

frequency division multiplexing of an uplink and a downlink;

full-frequency and full-time multiplexing of an uplink and a downlink; or time division multiplexing of an uplink and a downlink.

19. The non-transitory computer-readable storage medium according to claim 17, wherein the generating the desired guard symbol MAC CE when the preset trigger condition is met further comprises:

the generating, when the IAB node receives query information for a guard symbol sent by the corresponding parent IAB node, the desired guard symbol MAC CE based on the query information by the IAB node, wherein the query information is sent through any one of the following:

a MAC CE;

a physical downlink control channel (PDCCH);

a control protocol data unit (PDU); or radio resource control (RRC) signaling.

20. The non-transitory computer-readable storage medium according to claim 16, wherein the generating the desired guard symbol MAC CE when the preset trigger condition is met further comprises:

the generating, when the first cell of the IAB node is located in a first frequency band, the first cell is configured or activated, and all other pre-configured or activated cells of the IAB node are located in a second frequency band, the desired guard symbol MAC CE corresponding to the first cell by the IAB node, wherein the second frequency band is FR2 when the first frequency band is FR1; and the second frequency band is FR1 when the first frequency band is FR2.

* * * * *